US009000115B2

(12) United States Patent
Lee et al.

(10) Patent No.: US 9,000,115 B2
(45) Date of Patent: Apr. 7, 2015

(54) OLEFIN BLOCK COPOLYMERS AND PRODUCTION METHODS THEREOF

(75) Inventors: Yong Ho Lee, Incheon (KR); Manseong Jeon, Daejeon (KR); Heon-Yong Kwon, Daejeon (KR); Min-Seok Cho, Daejeon (KR); Seon Kyoung Kim, Daejeon (KR); Dae-Sik Hong, Gunpo-si (KR); Se Hui Sohn, Daejeon (KR); Ki-Soo Lee, Daejeon (KR); Kyoung-Chan Lim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 196 days.

(21) Appl. No.: 13/359,022

(22) Filed: Jan. 26, 2012

(65) Prior Publication Data

US 2012/0196985 A1 Aug. 2, 2012

(30) Foreign Application Priority Data

Jan. 27, 2011 (KR) .................. 10-2011-0008446
Jan. 28, 2011 (KR) .................. 10-2011-0009065

(51) Int. Cl.
*C08F 210/16* (2006.01)
*C08F 4/6592* (2006.01)
*C08F 210/14* (2006.01)
*C08F 297/08* (2006.01)
*C08F 4/659* (2006.01)

(52) U.S. Cl.
CPC ........... *C08F 210/14* (2013.01); *C08F 297/083* (2013.01); *C08F 4/65912* (2013.01)

(58) Field of Classification Search
USPC ............. 526/348, 348.2, 348.3, 348.5, 348.6, 526/160, 170
See application file for complete search history.

(56) References Cited

U.S. PATENT DOCUMENTS

| 2006/0199907 | A1 | 9/2006 | Chang et al. |
| 2008/0311812 | A1 | 12/2008 | Arriola et al. |
| 2011/0207903 | A1* | 8/2011 | Fontaine et al. ............. 526/170 |
| 2012/0123078 | A1 | 5/2012 | Lee et al. |

FOREIGN PATENT DOCUMENTS

| JP | 2008-545016 A | 12/2008 |
| JP | 2013500331 A | 1/2013 |
| KR | 10-2007-0098276 A | 10/2007 |
| KR | 10-2010-0067627 A | 6/2010 |
| KR | 10-2010-0102854 A | 9/2010 |
| KR | 10-2010-0107510 A | 10/2010 |
| KR | 10-2011-0013286 | * 2/2011 |
| KR | 10-2011-0013286 A | 2/2011 |
| WO | WO 2009/097560 | * 8/2009 |
| WO | WO 2009/097560 A1 | 8/2009 |
| WO | 2011-014022 A2 | 2/2011 |

OTHER PUBLICATIONS

KR application 10-2009-0070574, Jul. 2009, machine translation.*

* cited by examiner

*Primary Examiner* — Roberto Rabago
(74) *Attorney, Agent, or Firm* — McKenna Long & Aldridge, LLP

(57) ABSTRACT

The present description relates to olefin block copolymers having excellent elasticity and processability in conjunction with enhanced heat resistance, and to a preparation method thereof. The olefin block copolymers comprise a plurality of blocks or segments that comprise ethylene or propylene repeating units and α-olefin repeating units at different mole fractions from one another, wherein the block copolymer shows peaks at the 2θ of 21.5±0.5° and 23.7±0.5° in a wide-angle x-ray diffraction (WAXD) pattern, and the peak ratio defined by (the peak area at 21.5±0.5°)/(the peak area at 23.7±0.5°) is no more than 3.0.

12 Claims, 1 Drawing Sheet

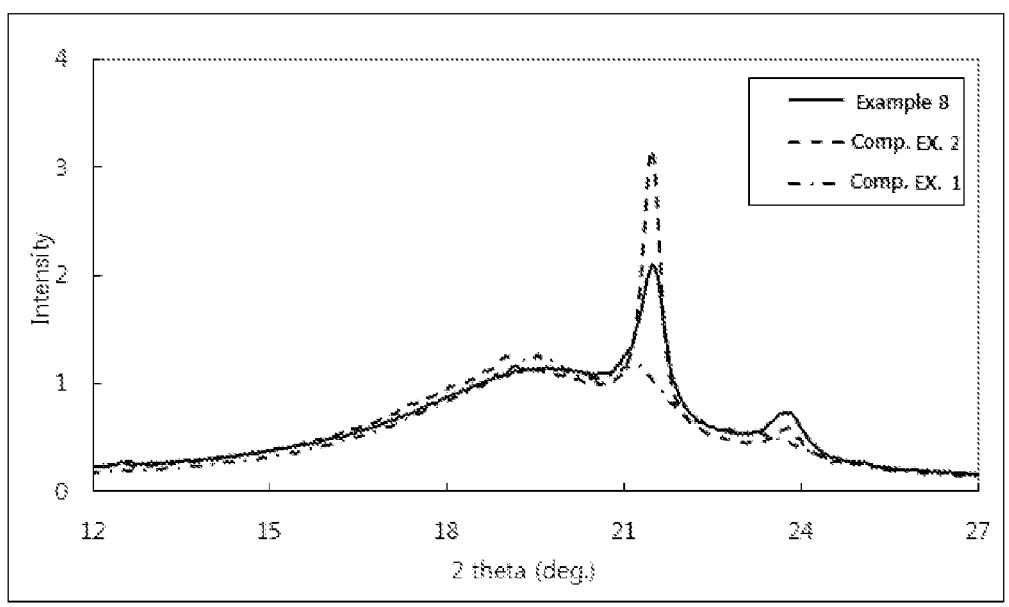

OLEFIN BLOCK COPOLYMERS AND PRODUCTION METHODS THEREOF

This application claims the benefit of Korean Patent Application Nos. 10-2011-0008446, filed in Korea on Jan. 27, 2011, and 10-2011-0009065, filed in Korea on Jan. 28, 2011, which are hereby incorporated by reference for all purposes in their entirety as if fully set forth herein.

TECHNICAL FIELD

The present description relates to olefin block copolymers and production methods thereof.

BACKGROUND

A block copolymer refers to a copolymer consisting of a plurality of blocks or segments of repeating units with different characteristics from one another. It tends to be superior to typical random copolymers or polymer blends in its properties. For example, the block copolymer may comprise both of soft elastic blocks (referred to as "soft segments") and hard crystalline blocks (referred to as "hard segments,") and this makes it possible for the polymer to exhibit properties such as excellent elasticity and heat resistance, together. More specifically, such block copolymers may have elasticity at a temperature equal to or higher than the glass transition temperature of the soft segment and can have relatively good heat resistance because they do not show a thermoplastic behavior until they reach a temperature higher than their melting temperature.

Specific examples of the aforementioned block copolymer include triblock copolymer of styrene and butadiene (SBS) and its hydrogenated product, which have been known to find applications in many fields due to their superiority in heat resistance and elasticity.

Recently, olefin elastomers such as copolymers of α-olefins with ethylene or propylene have been intensively studied for their use. More specifically, many attempts have been reviewed to employ such olefin elastomers in various fields, for example, in different uses for substituting for rubber materials. In a bid to make improvements on heat resistance of the olefin elastomers, some attempts have also been made to adopt a block copolymer type elastomer in lieu of conventional random copolymer-based olefin elastomers (e.g., an ethylene-α-olefin random copolymer). Moreover, various approaches have come under review to prepare block copolymer type olefin elastomers with excellent processability through a simple process.

SUMMARY

The present description provides olefin block copolymers having enhanced heat resistance in conjunction with excellent elasticity and processability, and a production method thereof.

According to an embodiment of the present description is provided an olefin block copolymer comprising a plurality of blocks or segments that comprise ethylene or propylene repeating units and α-olefin repeating units at different mole fractions from one another, wherein the block copolymer shows peaks at the 2θ of about 21.5±0.5° and about 23.7±0.5° in a wide-angle x-ray diffraction (WAXD) pattern and the peak area ratio as defined by (the peak area at about) 21.5±0.5°/(the peak area at about) 23.7±0.5° is no more than about 3.0, for example, from about 1.2 to 3.0, or from about 1.5 to 2.7.

In the WAXD pattern of such olefin block copolymer, a full width at half maximum (FWHM) value of the peak shown at 21.5±0.5° can be at least about 0.45°, for example from about 0.45° to 0.60°, or from about 0.49° to 0.55°.

In addition, the olefin block copolymer may have a degree of crystallization from about 10 to 30% as calculated from the ratio of the crystalline peak area to the pattern area in the WAXD pattern, and the block copolymer may also have a crystallization temperature ($T_c$) of 95 to 120° C. The olefin block copolymer may have a melting temperature ($T_m$) of about 110 to 135° C.

In its DSC pattern, the olefin block copolymer may also show a first peak at a melting temperature ($T_m$) of about 110 to 135° C., and optionally a second peak at a temperature different from that of the first peak, for example at a temperature of 40 to 105° C., and the first and the second peaks satisfy Mathematical Formula 1 as follows:

$$0 \leq A2/(A1+A2) < 1 \quad \text{[Mathematical Formula 1]}$$

in Mathematical Formula 1, A1 and A2 represent the areas of the first and the second peaks, respectively.

Further, the olefin block copolymer comprises a plurality of blocks or segments that comprise a hard segment comprising a first mole fraction of α-olefinic repeating units and a soft segment comprising a second mole fraction of α-olefinic repeating units, with the second mole fraction being higher than the first mole fraction. In this regard, the mole fraction of the α-olefin repeating units contained in the entire block copolymer can lie between the first mole fraction and the second mole fraction.

Further, the olefin block copolymer may comprise 20-95 mol % of the hard segments and 5-80 mol % of the soft segments, and the hard segments may have a higher value than the soft segments in terms of at least one characteristic among a degree of crystallization, a density, and a melting temperature.

The olefin block copolymer as described above may comprise about 80 to 98 mol % of ethylene or propylene repeating units and a remaining amount of α-olefin repeating units, and may have a density of about 0.85 $g/cm^3$ to 0.92 $g/cm^3$. In addition, the olefin block copolymer has a weight average molecular weight of about 5,000 to 3,000,000, and its polydispersity index is between 2.5 and 6.

According to other embodiments of the present description is also provided an olefin block copolymer comprising a plurality of blocks or segments that comprise ethylene or propylene repeating units and α-olefin repeating units at different ratios from one another, wherein its DSC pattern shows a first peak at a melting temperature ($T_m$) of 110 to 135° C., and optionally a second peak at a temperature different from that of the first peak, for example at a temperature of 40 to 105° C., and the first and the second peaks satisfy Mathematical Formula 1 as follows:

$$0 \leq A2/(A1+A2) < 1 \quad \text{[Mathematical Formula 1]}$$

in Mathematical Formula 1, A1 and A2 represent the areas of the first and the second peaks, respectively.

According to another embodiments of the present description is also provided a production method of olefin block copolymers. Such production method comprises:

copolymerizing α-olefins with ethylene or propylene at a temperature of 70 to 150° C. in the presence of a catalyst composition comprising a metallocene catalyst having a Group IV transition metal and a Lewis base functional group and a co-catalyst having a Lewis acid element and an organic functional group, and there occur alternatively between the metallocene catalyst and the cocatalyst a first state wherein the Lewis base functional group and the Lewis acid element form an acid-base bond and a second state wherein the metallocene catalyst and the cocatalyst has no interaction therebetween, and in the first state, the Group IV transition metal of the metallocene catalyst and the organic functional group of cocatalyst do interaction with each other.

In the production method, the α-olefin used as a monomer can be at least one selected from the group consisting of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

Further, in the production method of the olefin block copolymer, the metallocene catalyst may comprise a metallocene compound of Chemical Formula 1 and the cocatalyst may comprise a compound of Chemical Formula 3:

[Chemical Formula 1]

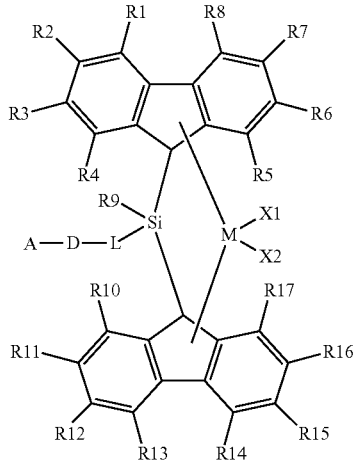

In Chemical Formula 1, R1 to R17 are the same with or different from each other, and are independently hydrogen, a halogen, a $C_1$-$C_{20}$ alkyl group, a $C_2$-$C_{20}$ alkenyl group, a $C_6$-$C_{20}$ aryl group, a $C_7$-$C_{20}$ alkylaryl group, or a $C_7$-$C_{20}$ arylalkyl group, respectively, L is a straight or branched chain $C_1$-$C_{10}$ alkylene group, D is —O—, —S— or —N(R)—, wherein R is hydrogen, a halogen, a $C_1$-$C_{20}$ alkyl group, a $C_2$-$C_{20}$ alkenyl group, or a $C_6$-$C_{20}$ aryl group, A is hydrogen, a halogen, a $C_1$-$C_{20}$ alkyl group, a $C_2$-$C_{20}$ alkenyl group, a $C_6$-$C_{20}$ aryl group, a $C_7$-$C_{20}$ alkylaryl group, a $C_7$-$C_{20}$ arylalkyl group, a $C_2$-$C_{20}$ alkoxy alkyl group, a $C_2$-$C_{20}$ heterocyclic alkyl group, or a $C_5$-$C_{20}$ heteroaryl group, and when the D is —N(R)—, R can be linked with A to form a heterocycle comprising nitrogen, for example, a five to eight membered heterocycle such as piperidinyl or pyrrolydinyl moiety, M is a Group IV transition metal, X1 and X2 are the same with or different from each other, and are independently a halogen, a $C_1$-$C_{20}$ alkyl group, a $C_2$-$C_{20}$ alkenyl group, a $C_6$-$C_{20}$ aryl group, a nitro group, an amido group, a $C_1$-$C_{20}$ alkyl silyl group, a $C_1$-$C_{20}$ alkoxy group, or a $C_0$-$C_{20}$ sulfonate group, respectively.

—[Al(R18)-O]$_n$— [Chemical Formula 3]

In Chemical Formula 3, R18s are the same with or different from each other, and are independently C1 to C20 hydrocarbon; or C1 to C20 hydrocarbon substituted with a halogen; and n is an integer of at least two.

In accordance with the present description, there can be provided olefin block copolymers having enhanced heat resistance in conjunction with excellent elasticity and processability, and a preparation method thereof. In particular, such olefin block copolymers can be prepared through simple process steps with using a simplified catalyst system.

Accordingly, such olefin block copolymer can greatly contribute to commercialization of the olefin elastomers that are superior in heat resistance and all the properties thereof and makes it possible for such olefin elastomers to be properly substituted for rubber materials in a range of fields.

BRIEF DESCRIPTION OF THE DRAWINGS

FIG. 1 is a view showing the WAXD pattern obtained from the experimental example as to the olefin block copolymers of the examples in comparison with a heat resistant olefin elastomer (the ethylene-α-olefinic block copolymer) and the ethylene-α-olefin random copolymer of the comparative examples.

DETAILED DESCRIPTION OF THE EMBODIMENTS

Hereinafter, the olefin block copolymer according to embodiments of the present description and the production method thereof will be explained in further detail. However, these embodiments are presented as a mere illustration and the scope of the invention is not limited thereby. Moreover, it is apparent to a person of ordinary skill in the art that the embodiments may be modified in many ways.

In the entire specification, some terms are defined as follows unless they are particularly stated otherwise.

In the entire specification, the term "(olefin) block copolymer" refers to a copolymerized polymer of ethylene or propylene with α-olefins, wherein it comprises a plurality of repeating unit blocks or segments that are distinguishable from one another as they differ in at least one of their physical or chemical properties; for example, the content (mole fraction) of the repeating units derived from ethylene (or propylene) and the α-olefins, respectively, a degree of crystallization, a density, or a melting temperature.

A plurality of such blocks or segments can comprise, for example, ethylene or propylene repeating units and α-olefin repeating units, but comprise each of the repeating units at different contents (mole fractions) from one another. By way of an example, a plurality of the blocks or the segments may comprise a hard segment of a hard crystalline block comprising α-olefins at a first mole fraction and a soft segment of a soft elastic block comprising α-olefins at a second mole fraction being higher than the first mole fraction. In this regard, the first mole fraction can be lower than the mole fraction of the α-olefin repeating units as measured for the entire block copolymer, while the second mole fraction may be higher than the mole fraction of the α-olefin repeating units as measured for the entire block copolymer.

In addition, a plurality of the blocks and the segments may be distinguished from each other in terms of at least one of other properties such as a degree of crystallization, a density, and a melting point. For example, in comparison with the soft segment of the soft elastic block, the hard segment of the hard crystalline block may have a higher value in terms of at least one or two characteristics of the degree of crystallization, the density, and the melting temperature.

Besides the mole fractions of the ethylene or propylene repeating units and of α-olefin repeating units, the degree of crystallization, the density, and the melting temperature, the olefin block copolymers of the embodiment disclosed herein can also be defined by crystalline characteristics determined by a WAXD pattern or the like, which will be explained below in further detail.

In such embodiment, the olefin block copolymer may comprise a plurality of blocks or segments that comprise the ethylene or propylene repeating units and the α-olefin repeating units at different mole fractions from one another. Further, such olefin block copolymer is characterized in that its wide angle X-ray diffraction (WAXD) pattern shows peaks at the 2θ of about 21.5±0.5° and about 23.7±0.5° and the peak area ratio as defined by (the peak area at about 21.5±0.5°)/(the peak area at about 23.7±0.5°) is no more than about 3.0.

In such embodiments, the olefin block copolymer is prepared from copolymerization of ethylene or propylene with an α-olefin, and comprises repeating units derived therefrom, and the α-olefin repeating units derived from the α-olefin make it possible for the polymer to show excellent elasticity.

In addition, because such olefin block copolymer is prepared by using such a catalyst system as will be described herein below, it may comprise a plurality of blocks or segments that comprise the ethylene or propylene repeating units and the α-olefin repeating units at different mole fraction from each other. For example, the block copolymer may comprise the hard segments of the hard crystalline blocks comprising a first mole fraction of the α-olefin repeating units and the soft segments of the soft elastic blocks comprising a second mole fraction of the α-olefin repeating units with the second mole fraction being higher than the first mole fraction. At this time, the mole fraction of the α-olefin repeating units included in the entire block copolymer can have a value lying between the first mole fraction and the second mole fraction. In other words, the first mole fraction can be lower than the mole fraction of the α-olefin repeating units as calculated for the entire block copolymer, while the second mole fraction may be higher than the mole fraction of the α-olefin repeating units as calculated for the entire block copolymer.

As such, the olefin block copolymer of the embodiment comprises a plurality of blocks or segments. For example, because it includes a hard segment of a hard crystalline block with a higher mole fraction of the ethylene or propylene repeating units, the block copolymer according to the embodiment may show a melting temperature as high as about 110 to 135° C., about 115 to 130° C., or about 115 to 125° C. Such a melting temperature is higher than that of the previously known random copolymer of ethylene and α-olefins. Accordingly, the block copolymer of the embodiment may show enhanced heat resistance in comparison with the previously-known olefin elastomers such as a random copolymer of ethylene and an α-olefin, and it can also have an excellent level of elasticity as an elastomer even at a higher temperature.

A plurality of the blocks or the segments being contained in the block copolymer of the embodiment, for example, the hard segments and the soft segments can be distinguished from each other by one or more of other characteristics such as a degree of crystallization, a density, or a melting temperature. For example, the hard segment of the hard crystalline block comprising a higher mole fraction of the ethylene or propylene repeating units may have a higher value in at least one characteristic of the degree of crystallization, the density, the melting point, and the like, in comparison with the soft segment of the soft elastic block comprising a relatively higher mole fraction of the α-olefin. This may be due to the fact that the hard segments have a higher degree of crystallization. Such blocks or segments can be characterized and/or classified by a method of obtaining a (co)polymer corresponding to each block or segment and characterizing the same.

As such, the block copolymer of the embodiment comprises a plurality of blocks or segments having different properties, and thus it can show excellent heat resistance in conjunction with superb elasticity. For example, the block copolymer comprises the soft segment of the soft elastic block, thereby showing excellent elasticity. Besides, since the block copolymer comprises the hard segment of crystalline blocks having a high melting point, it would not lose such excellent elasticity until its temperature reaches the high melting temperature. Accordingly, the block copolymer may exhibit excellent heat resistance.

Furthermore, the block copolymer of the foregoing embodiment may have unique crystalline characteristics defined by a certain wide-angle X-ray diffraction (WAXD) pattern. These crystalline characteristics may be determined by the WAXD pattern wherein the peaks are shown at the 2θ of about 21.5±0.5° and about 23.7±0.5° and the peak area ratio defined by (the peak area at about 21.5±0.5°)/(the peak area at about 23.7±0.5°) is about 3.0 or less, for example, about 1.2 to 3.0, or about 1.5 to 2.7.

In this regard, the area of each peak can be obtained by carrying out deconvolution with respect to each peak shown in the WAXD pattern, and the peak area ratio can be obtained therefrom. The drawing range of the WAXD pattern can be limited within the range of the 2θ from about 11° to 35°. With the WAXD pattern being drawn to include each peak, one can carry out deconvolution with a single line fitting by using the Fundamental parameter (FP) approach of Bruker TOPAS program to obtain the area of each peak and the ratio therebetween. In this regard, one can use Chebychev 3rd order function as a background when operating the TOPAS program. In addition, regarding the peaks shown at the 2θ of about 21.5±0.5° and about 23.7±0.5°, respectively, one can designate the 2θ of about 20 to 22° and about 22 to 24° as the center of each peak in the TOPAS program and carry out deconvolution with the single line fitting to obtain the area of each peak. The peak area ratio may be calculated from the area of each peak thus obtained.

Moreover, what may be inferred from the presence of the aforementioned two peaks in the WAXD pattern is that there are orthorhombic (110) and (200) crystalline regions. In addition, since the peak area ratio is no more than about 3.0, it may be expected that the abundance for each of the orthorhombic (110) and (200) crystalline regions would be within a certain range.

As such, the block copolymer of the embodiment is characterized in that as determined by the WAXD pattern, it has certain crystalline characteristics such as the presence of the orthorhombic (100) and (200) crystalline regions and these crystalline regions exist at a certain ratio therebetween. Such block copolymer may have a higher degree of crystallization than a random copolymer having a similar density, and such a high degree of crystallization can be indicated by a crystallization temperature (TO of the block copolymer. For example, the block copolymer has a crystallization temperature as high as about 95 to 120° C., or about 100 to 115° C., or about 102 to 110° C. Therefore, the block copolymer of the embodiment is characterized by the high degree of crystallization as inferred from the aforementioned WAXD pattern, thereby exhibiting excellent heat resistance.

In addition, the block copolymer of the embodiment exhibits a high crystallization temperature and unique crystalline characteristics defined by their WAXD pattern including the peaks at certain positions and the peak area ratio therebetween. Accordingly, the block copolymer of the embodiment may undergo a more rapid crystallization after being melted in a melt process and thus enables a high speed molding. Therefore, the block copolymer of the embodiment can have excellent processability and moldability into a product. In particular, the crystalline characteristics of the embodiment as defined by the position of certain peaks and the ratio of the peak areas in the aforementioned WAXD pattern are novel ones of the block copolymer newly discovered in the present description. The block copolymer of the embodiment having such novel crystalline characteristics may undergo a more rapid crystallization after being melted, and it can be processed more quickly to have excellent moldability into a product, which will be proved by the following examples.

In the WAXD pattern of the block copolymer of the embodiment, the full width at half maximum (FWHM) value for the peak shown at about 21.5±0.5° may be about 0.45° or higher, for example, about 0.45° to 0.60°, or about 0.49° to 0.55°. In this regard, the FWHM value for each peak can be determined by using an area function of the Bruker EVA program. By way of an example, in order to measure the FWHM value of the peak shown at about 21.5±0.5°, one may set the peak measuring range from about 20 to 23° in the EVA program and use the function of such area to measure the FWHM value of the corresponding peak.

The FWHM value of the block copolymer of the embodiment, which is at least about 0.45°, may indicate that the peak shown at about 21.5±0.5° has a relatively broad shape and there are many orthorhombic (110) crystalline regions corresponding to the peak, the size of which are relatively small. These results can also reflect unique crystalline characteristics of the olefin block copolymer of the embodiment. The block copolymer of this embodiment having such crystalline characteristics may show more enhanced processability and moldability into a product in conjunction with excellent heat resistance. In contrast with the block copolymer of this embodiment, the ethylene-α-olefin block copolymer failing to meet the condition that the FWHM value is at least about 0.45° comprises many of relatively large crystalline regions and thus exhibits different crystalline characteristics from the block copolymer of the embodiment. When being compared with the ethylene-α-olefin block copolymer having such different crystalline properties, the block copolymer of the embodiment can have a higher crystallization temperature, excellent moldability into a product, heat resistance, and the like.

In addition, the block copolymer of the foregoing embodiment may have a degree of crystallization from about 10 to 30%, or from about 15 to 25%, or from about 16 to 23% as calculated by the ratio of the crystalline peak areas to the pattern area in the WAXD pattern. At this time, deconvolution is carried out for the peaks and the amorphous region patterns in the WAXD pattern to calculate the areas of each peak and amorphous region pattern, and then the degree of crystallization can be calculated according to Mathematical Formula 2 as follows. For example, each peak area and the pattern area of the amorphous regions can be obtained by conducting deconvolution with a single line fitting by using the Fundamental parameter (FP) approach of the Bruker TOPAS program. In this regard, specified methods for calculating each peak area are the same as already explained in the above for the WAXD pattern, and thus detailed explanations will be now omitted. In order to obtain the pattern area of the amorphous region, one may designate the 2θ of about 11° to 35° as a range to be measured, and the center of the halo (the amorphous region pattern in the lower part of the crystalline peak) shown in this range as an approximate 2θ value around the middle of the measuring range, and carry out deconvolution with single line fitting in the same manner. On calculation of the degree of the crystallization, the drawing range of the WAXD pattern for calculating the pattern area of the amorphous region and the area of each peak may be defined within the 2θ range of about 11° to 35°.

Degree of crystallization (%)=
{(B+C)/(A+B+C)}*100    [Mathematical Formula 2]

In Mathematical Formula 2, A is, for example, the area of the WAXD pattern corresponding to the amorphous region in the 2θ range of about 11° to 35°, for example, the area of the halo shown in the 2θ range of about 11° to 35°, and B is the area of the peak at about 21.5±0.5°, and C is the area of the peak at about 23.7±0.5°.

As such, the block copolymer of the embodiment has a degree of crystallization equal to or higher than a certain level, thus showing an increased crystallization temperature such that the block copolymer may undergo crystallization more quickly when being melted in a melting process. For example, when the block copolymer is melted and molded into a product with a temperature decreasing, the comparatively high crystallization temperature and the relatively high degree of crystallization make it possible for the polymer to reach the crystallization temperature more quickly, allowing a high speed molding and processing into a product. Therefore, the block copolymer of the embodiment can have excellent processability and moldability into a product.

In addition, the unique crystallization characteristics of the block copolymer according to the embodiment can be confirmed by certain characteristics as shown in the DSC pattern. For example, such block copolymer has a first peak shown in the melting temperature range of 110 to 135° C. and a second peak as optionally shown at a temperature different from that of the first peak, wherein the first peak and the second peak may satisfy Mathematical Formula 1 as follows:

0≤A2/(A1+A2)<1    [Mathematical Formula 1]

in Mathematical Formula 1, A1 and A2 represent the areas of the first peak and the second peak, respectively.

In this regard, one may determine the area of each peak in the DSC pattern by obtaining a DSC pattern for the block copolymer, setting a base line for each peak, and calculating the peak area over the base line. In this regard, one may use a DSC measuring instrument manufactured by TA instrument Co. Ltd. In addition, one can designate as a base line the line connecting two points within the range of about ±20° C. based on the top of each peak. For example, in the region, where the curve on the DSC pattern has a second derivative below zero (0), one can designate as a base line the line connecting two points having the lowest heat flow value within the range of about ±20° C. based on the top of each peak. By contrast, in the region where the curve on the DSC pattern has a second derivative above zero (0), one can designate as a base line the line connecting two points having the highest heat flow value within the range of about ±20° C. based on the top of each peak. In the block copolymer of the embodiment, the first peak may appear in the range of a melting temperature from about 110 to 135° C., or from about 115 to 130° C., and the second peak may not be shown separately, or may appear in the range from about 40 to 105° C. or from about 50 to 90° C. with a lower strength or with a smaller area than that of the first peak. Therefore, in the temperature range wherein each peak appears, one can set the lowest value of the heat flow (for the region where the second derivative is below zero) or the highest value of the heat flow (for the region where the second derivative is above zero) as the apex of each peak, based on which the base line is determined and a value for Mathematical Formula 1 may be obtained. In the block copolymer of the embodiment, the value for Mathematical Formula 1 is at least about zero and less than 1, and for example it can be from about zero to 0.9, or from zero to 0.5, or about zero to 0.4, or about 0.05 to 0.38.

As such, the unique crystalline characteristics of the block copolymer of the embodiment can be confirmed by the fact that there appear(s) one peak or optionally two peaks in the DSC pattern, and the ratio between the peak areas is within a certain range. The block copolymer of the embodiment with such unique crystalline characteristics may have a higher crystallization temperature in conjunction with excellent heat resistance and elasticity, and show enhanced moldability into a product when compared with the previously known olefin elastomers.

In the aforementioned embodiment, the olefin block copolymer may comprise ethylene or propylene repeating units at a content (mole fraction) of about 80 to 98 mol %, or about 80 to 93 mol %, or about 85 to 95 mol %. In addition to the ethylene or propylene repeating units, the block copolymer may comprise α-olefin repeating units at a remaining content (mole fraction) of, for example, 2-20 mol % or about 7-20 mol %, or about 5-15 mol %. When the block copolymer of the embodiment comprises such a mole fraction of the α-olefin repeating units, it can have excellent elasticity, and its mole fraction of the ethylene or propylene repeating units may be optimized, enabling the polymer to have a high melting point and excellent heat resistance.

Further, the block copolymer of the embodiment may comprise a hard segment at a mole fraction of about 20 to 95 mol %, or about 25 to 90 mol %, or about 20 to 85 mol %, and a soft segment at a remaining mole fraction of, for example, 5 to 80 mol %, or about 10 to 75 mol %, or about 15 to 80 mol %.

In this regard, the mole fraction of the hard segment can be calculated by using Time Domain NMR (TD NMR) equipment. More specifically, the TD NMR equipment can be used to measure a Free Induction Decay (FID) for a block copolymer sample and the FID may be obtained as a function of time and intensity. In Mathematical Formula 3, one may change four constants of A, B, $T2_{fast}$, and $T2_{slow}$ and derive a function having a graph most similar to that of the FID function, through which the A, B, $T2_{fast}$, and $T2_{slow}$ of the sample may be determined. For reference, the hard segment have a rapid T2 (spin-spin relaxation time) relaxation derived therefrom and the soft segment a slow T2 (spin-spin relaxation time) relaxation derived therefrom. Therefore, among the values of A, B, $T2_{fast}$, and $T2_{slow}$ determined in the above, the smaller T2 value can be determined as the T2 of the hard segment (i.e., $T2_{fast}$) while the larger T2 value can be determined as the T2 of the soft segment (i.e., $T2_{slow}$). Through such procedure, one may calculate the constants A and B together with the content (mol %) of the hard segment.

Intensity=$A \times EXP(-Time/T2_{fast}) + B \times EXP(-Time/T2_{slow})$ [Mathematical Formula 3]

Determination of A, B, $T2_{fast}$, $T2_{slow}$ through the fitting

Hard segment(mol %)=$A/(A+B) \times 100$

In Mathematical Formula 3, the intensity and the time are the values derived from the results of the FID analysis, $T2_{fast}$ is the T2 (spin-spin relaxation time) relaxation for the hard segment, and $T2_{slow}$ is the T2 (spin-spin relaxation time) relaxation for the soft segment. Further, A and B are the constants determined by the fitting and have the values proportionate to the content of each segment, representing the relative ratios of the hard segment and the soft segment, respectively.

As mentioned above, among a plurality of blocks or segments contained in the block copolymer, the hard segment may refer to the hard crystalline segment comprising a higher mole fraction of the ethylene or propylene repeating units, and the soft segment may refer to the soft elastic segment comprising a higher mole fraction of the α-olefin repeating units. When the block copolymer of the embodiment comprises the hard segment and the soft segment at certain mole fractions, respectively, it may have excellent elasticity due to the presence of the soft segment together with a high melting temperature and enhanced heat resistance due to the presence of the hard segment.

Further, the block copolymer of the embodiment may have a density of about 0.85 $g/cm^3$ to 0.92 $g/cm^3$, or about 0.86 $g/cm^3$ to 0.90 $g/cm^3$, or about 0.86 $g/cm^3$ to 0.91 $g/cm^3$, and a weight average molecular weight of about 5,000 to 3,000,000, or about 10,000 to 1,000,000, or about 50,000 to 200,000. In addition, the block copolymer has a molecular weight distribution of about 2.5 to 6, or about 2.6 to 5 or about 2.5 to 3.5. As the block copolymer of the embodiment has such properties including the density, the molecular weight distribution, and the like, it may have characteristics suitable for an elastomer, excellent mechanical properties, processability, and the like. In particular, the block copolymer of the embodiment has a relatively high level of the molecular weight distribution of at least 2.5, showing excellent processability.

In addition, the block copolymer comprises α-olefin repeating units together with the ethylene or propylene repeating units. Such α-olefin repeating units can be any repeating unit derived from α-olefins such as 1-butene, 1-pentene, 4-methyl-1-pentene, 1-hexene, 1-heptene, 1-octene, 1-decene, 1-undecene, 1-dodecene, 1-tetradecene, 1-hexadecene, or 1-itocene. It can comprise the repeating units derived from at least two monomers selected from the foregoing.

The block copolymer of the aforementioned embodiment may show excellent elasticity due to the inclusion of the α-olefin repeating units and it may also have excellent heat resistance caused by well-defined blocks contained therein and a higher degree of crystallization. In addition, the block copolymer of the embodiment can show a higher crystallization temperature and novel crystalline characteristics determined by the WAXD pattern. Due to their crystalline characteristics, the block copolymer of the embodiment is able to achieve a more rapid crystallization when being subjected to a melting process and thus its melting process would proceed faster and its processability or moldability into a product can be enhanced. Therefore, the block copolymer of the embodiment will overcome the limitation on the field to which olefin elastomers are applied and it will find application in a range of the fields requiring heat resistance.

The block copolymer of the embodiment may be adopted to substantially all the fields to which elastomers have been applied so far. Moreover, the block copolymer of the embodiment finds application in a variety of fields to which prior-art elastomers have failed to be applied in effect due to their low level of heat resistance such that rubber materials have been used instead. For example, the block copolymer of the embodiment finds applications in uses for forming various products including parts or interior materials for vehicles such as bumpers or trim parts; packaging materials, different electrical insulation materials, and the like; diverse household items such as shoe soles, tooth brush grips, flooring materials, or device grips; all sorts of adhesives such as a pressure-sensitive adhesive or a hot-melting adhesive; hoses; and pipes. Of course, it can be applied for other different fields and uses.

In addition, not only may the block copolymer of the embodiment be used alone but also it can be blended with other polymers, resins, or all sorts of additives to be used, and it can be used in any form such as a film, a molded product, or a fiber.

Further, according to another embodiment of the present description is provided a production method of the olefin block copolymer as described above. The production method of the olefin block copolymer may comprise subjecting ethylene or propylene and an α-olefin to copolymerization at about 70 to 150° C. in the presence of a catalyst composition which comprises a metallocene catalyst having a Group IV transition metal and a Lewis base functional group and a cocatalyst having a Lewis acid element and an organic functional group. In particular, such production method is characterized in that at the temperature of the copolymerization, the metallocene catalyst and the cocatalyst are alternatively either in a first state wherein the Lewis base functional group and the Lewis acid element make an acid-base bond or in a second state wherein no interaction occurs between the metallocene catalyst and the cocatalyst. In the first state, the Group IV transition metal of metallocene catalyst and the organic functional group of the cocatalyst may also have interaction therebetween.

When the ethylene or propylene monomer and the α-olefin monomer are subjected to copolymerization in the presence of the catalyst composition comprising the cocatalyst and the metallocene catalyst with such characteristics, it is assumed that due to the following technological reasons, the preparation of the block copolymer of the embodiment can be achieved.

The metallocene catalyst has the Group IV transition metal as the center metal element while it comprises a Lewis base functional group having an unshared electron pair such as a functional group comprising oxygen, nitrogen, or sulfur. The cocatalyst being used together comprises a Lewis acid element such as aluminum or boron capable of bonding with the unshared electron pairs and an organic functional group. When being used in the polymerization system, these two types of the metallocene catalyst and the cocatalyst may be in a first state wherein the Lewis base functional group and Lewis acid element make a Lewis acid-base bond at the polymerization temperature while the Group IV transition metal and the organic functional group of the cocatalyst do interaction with each other. Additionally, the catalyst and the cocatalyst may be optionally in a second state wherein no interaction occurs between the metallocene catalyst and the cocatalyst, for example, the Lewis base functional group and the Lewis acid element fail to form a Lewis acid-base bond, or there occurs no interaction between the Group IV transition metal and the organic functional group. In particular, the catalyst and the cocatalyst may be alternatively either in the first state or in the second state. This is because the energy gap between the first state and the second state is so small in the order of no more than 10 kcal/mol, or no more than at least 5 kcal/mol that the catalyst and the cocatalyst is expected to be capable of easily coming and going over such energy threshold at the polymerization temperature.

Such energy gap may be easily determined by a person of ordinary skill in the art with using Gaussian program in a computational chemistry manner. In this regard, the state wherein the Lewis acid-base bond is made in the first state collectively refers to not only the case where the Lewis base functional group and the Lewis acid element are linked together through a covalent bond or a coordination bond, but also the case where they have interaction through a van der Waals force or a sigmatropic bond corresponding thereto. In addition, the state wherein the Group IV transition metal and the organic functional group of the cocatalyst have interaction may refer to the case where they make an interaction with each other through the van der Waals force or the sigmatropic bond corresponding thereto. Moreover, the situation wherein no interaction occurs between the metallocene catalyst and the cocatalyst in the second state may refer to the case where no Lewis acid-base bond between the Lewis base functional group and the Lewis acid element is made for the catalyst and the cocatalyst, or the case where the Group IV transition metal and the organic functional group have no interaction therebetween.

In this regard, when the metallocene catalyst and the cocatalyst are in the first state, the Lewis acid-base bond and the interaction between the Group IV transition metal and the organic functional group have an effect of allowing the space surrounding the central metal element of the metallocene catalyst to be narrowed. For this reason, in the first state, the ethylene or propylene monomers may have an easier access to the catalyst and be polymerized more readily than the relatively large, α-olefin monomer. By contrast, when the metallocene catalyst and the cocatalyst are in the second state, the space surrounding the central metal element of the metallocene catalyst becomes relatively broader so that the large α-olefin monomer may have access to the catalyst more easily, and thus an increased content of the α-olefin monomers can be polymerized.

As such, using the metallocene catalyst and the cocatalyst as specified in the above makes it possible to alternatively bring about the first state causing a higher content of the ethylene or propylene monomers to be polymerized and the second state causing a higher content of the α-olefin monomers to be polymerized. As a result, the olefin block copolymer obtained by the other embodiment may include hard segments comprising a higher mole fraction of the ethylene or propylene repeating units and soft segments comprising a higher mole fraction of the α-olefin repeating units. In particular, such olefin block copolymers can be prepared by employing a more simplified catalyst system without using a complicate catalyst system that includes two types of transition metal. As mentioned above, such olefin block copolymer may also comprise well-defined blocks and exhibit novel crystalline characteristics.

In the production method of the other embodiments, the polymerization temperature may range from about 70° C. to 150° C., or from about 80° C. to 120° C., or from about 90° C. to 100° C. At such polymerization temperature, the energy threshold lying between the first and the second states may be easily overpassed, allowing the polymerization reaction for each monomer to proceed efficiently. Therefore, at such polymerization temperature, it is possible to obtain more easily olefin block copolymers having plenty of well-defined blocks and excellent crystalline characteristics at high yields.

In addition, the production method of the other embodiment may adopt a metallocene catalyst which comprises a Group IV transition metal as the central metal element while including a Lewis base functional group, for example a functional group having O, N, or S with an unshared electron pair. The types of such metallocene catalyst are not particularly limited, but taking into account the fact that such catalyst should be allowed to properly bring about the first state and the second state in an alternating manner, and also considering the polymerization activity for the ethylene or propylene monomers and the α-olefin monomers in each state, one may use a metallocene compound represented by Chemical Formula 1 for the metallocene catalyst:

[Chemical Formula 1]

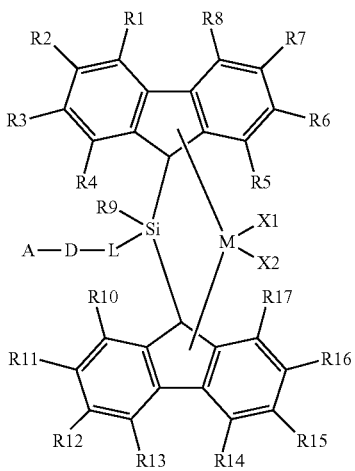

In Chemical Formula 1, R1 to R17 are the same with or different from each other, and are independently hydrogen, a halogen, a $C_1$-$C_{20}$ alkyl group, a $C_2$-$C_{20}$ alkenyl group, a $C_6$-$C_{20}$ aryl group, a $C_7$-$C_{20}$ alkylaryl group, or a $C_7$-$C_{20}$ arylalkyl group, respectively, L is a straight or branched chain $C_1$-$C_{10}$ alkylene group, D is —O—, —S— or —N(R)—, wherein R is hydrogen, a halogen, a $C_1$-$C_{20}$ alkyl group, a $C_2$-$C_{20}$ alkenyl group, or a $C_6$-$C_{20}$ aryl group, A is hydrogen, a halogen, a $C_1$-$C_{20}$ alkyl group, a $C_2$-$C_{20}$ alkenyl group, a $C_6$-$C_{10}$ aryl group, a $C_7$-$C_{20}$ alkylaryl group, a $C_7$-$C_{20}$ arylalkyl group, a $C_2$-$C_{20}$ alkoxy alkyl group, a $C_2$-$C_{20}$ heterocyclic alkyl group, or a $C_5$-$C_{20}$ heteroaryl group, and when the D is —N(R)—, R can be linked with A to form a heterocycle comprising nitrogen, for example, a five to eight membered heterocycle such as piperidinyl or pyrrolydinyl moiety, M is a Group IV transition metal, and X1 and X2 are the same with or different from each other, and are independently a halogen, a $C_1$-$C_{20}$ alkyl group, a $C_2$-$C_{20}$ alkenyl group, a $C_6$-$C_{20}$ aryl group, a nitro group, an amido group, a $C_1$-$C_{20}$ alkyl silyl group, a $C_1$-$C_{20}$ alkoxy group, or a $C_0$-$C_{20}$ sulfonate group, respectively.

Such metallocene catalyst includes a Group IV transition metal (M) as a central metal element while comprising an "A-D" functional group wherein A is linked to oxygen, sulfur, or nitrogen of the D having an unshared electron pair. Therefore, the unshared electron pair contained in the functional group "A-D-" may act as a Lewis base to form an acid-base bond with the Lewis acid element of the co-catalyst and the Group IV transition metal may interact with the organic group of the co-catalyst. As a result, the metallocene catalyst and the cocatalyst may be alternatively either in the first state or in the second state, enabling the copolymerization of the ethylene or propylene monomers and the α-olefin monomers.

Regarding the metallocene compound of Chemical Formula 1, a more specific explanation as to each substituent will be given as follows:

The $C_1$-$C_{20}$ alkyl group includes a straight or branched chain alkyl group, and its specific examples include, but are not limited to, a methyl group, an ethyl group, an propyl group, an isopropyl group, an n-butyl group, a tert-butyl group, a pentyl group, a hexyl group, a heptyl group, and an octyl group.

The $C_2$-$C_{20}$ alkenyl group includes a straight or branched chain alkenyl group, and its specific examples include, but are not limited to, an allyl group, an ethenyl group, a propenyl group, a butenyl group, and a pentenyl group.

The $C_6$-$C_{20}$ aryl group includes a monocyclic or a condensed cyclic aryl group, and its specific examples include, but are not limited to, a phenyl group, a biphenyl group, a naphthyl group, a phenanthrenyl group, and a fluorenyl group.

The $C_5$-$C_{20}$ heteroaryl group includes a monocyclic or a condensed cyclic heteroaryl group, and its examples include, but are not limited to, a carbazolyl group, a pyridyl group, a quinolin group, a isoquinolin group, a thiophenyl group, a furanyl group, a imidazolyl group, a oxazolyl group, a thiazolyl group, a triazine group, a tetrahydropyranyl group, and tetrahydrofuranyl group.

Examples of $C_1$-$C_{20}$ alkoxy group include, but are not limited to, a methoxy group, an ethoxy group, a phenyloxy group, and a cyclohexyloxy group.

Examples of the Group IV transition metal include, but are not limited to, titanium, zirconium, and hafnium.

In light of a suitable activity and characteristics of the metallocene compound of Chemical Formula 1, R1 to R17 in Chemical Formula 1 may also be independently hydrogen, a methyl group, an ethyl group, an propyl group, an isopropyl group, an n-butyl group, a tert-butyl group, a pentyl group, a hexyl group, a heptyl group, an octyl group, or a phenyl group, respectively, and besides the foregoing, it can be anyone of various substituents.

Further, in the metallocene compound of Chemical Formula 1, L is a $C_4$-$C_8$ straight or branched chain alkylene group. In addition, the alkylene group may be unsubstituted or substituted with a $C_1$-$C_{20}$ alkyl group, a $C_2$-$C_{20}$ alkenyl group, or a $C_6$-$C_{20}$ aryl group.

In the metallocene compound, A of Chemical Formula 1 can be hydrogen, a methyl group, an ethyl group, an propyl group, an isopropyl group, an n-butyl group, a tert-butyl group, a methoxy methyl group, a tert-butoxy methyl group, an 1-ethoxy ethyl group, an 1-methyl-1-methoxy ethyl group, a tetrahydropyranyl group, or a tetrahydrofuranyl group, and it can be other various substituent groups, as well.

In addition, specific examples of the metallocene compound of Chemical Formula 1 include, but are not limited to, a compound represented by Chemical Formula 2:

[Chemical Formula 2]

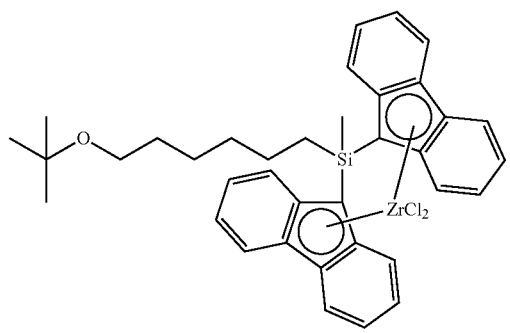

In the production method of the other embodiment, the aforementioned metallocene catalyst may be used together with a cocatalyst having a Lewis acid element such as aluminum or boron and an organic functional group. The types of the cocatalyst are not particularly limited, but for a representative example of such cocatalyst, mentions may be made of the cocatalyst compound represented by Chemical Formula 3 as follows:

—[Al(R18)-O]$_n$—     [Chemical Formula 3]

In Chemical Formula 3, R18s are the same with or different from each other, and are independently a C1-C20 hydrocarbon; or a C1-C20 hydrocarbon substituted with a halogen; and n is an integer of at least two, for example, an integer of 2 to 6.

Such cocatalyst includes aluminum as a Lewis acid element and also comprises an organic functional group of R18. It can properly form a Lewis acid-base bond together with the metallocene catalyst such as a compound of Chemical Formula 1, while interacting with the Group IV transition metal of the metallocene catalyst. In addition, when the metallocene catalyst of Chemical Formula 1 being used, the energy gap between the first and the second states is not really large and thus at the copolymerization temperature, the metallocene catalyst and the cocatalyst may be alternatively either in the first state or in the second state, enabling copolymerization of the ethylene or propylene monomer and the α-olefin monomers to occur. In addition, the cocatalsyt shows a proper polymerization activity for the ethylene or propylene monomer and the α-olefin monomers when being used together with, for example, the aforementioned metallocene catalyst of Chemical Formula 1. Accordingly, using the cocatalyst together with a suitable metallocene catalyst enables one to prepare the olefin block copolymer of the embodiment more conveniently, which has a higher degree of crystallization along with well-defined blocks.

For examples of the cocatalyst of Chemical Formula 3, mentions may be made of methyl aluminoxane, etheyl aluminoxane, isobutyl aluminoxane, and butyl aluminoxane, among which methyl aluminoxane and the like can be typically used.

A catalyst composition comprising the metallocene catalyst and the cocatalyst may be prepared by a typical method such as bringing the metallocene catalyst into contact with the cocatalyst. In addition, if a further cocatalyst is to be used, one may bring the metallocene catalyst into contact either with all the cocatalysts simultaneously or with each of the cocatalysts one by one. At this time, it may be advantageous in light of the interaction between the metallocene catalyst and the cocatalyst that the metallocene catalyst is brought into contact first with the cocatalyst of Chemical Formula 3 prior to being contacted with other cocatalyst.

In addition, the mole ratio between the metallocene catalyst and the cocatalyst is from about 1/5,000 to 1/2, or from about 1/1,000 to 1/10, or from about 1/500 to 1/20. With adopting such mole fraction, one may have the interaction between the metallocene catalyst and the cocatalyst occur properly while avoiding the problems caused by an excessive amount the cocatalyst such as a decrease in the activity of the metallocene or an increase in the production cost.

In the preparation of the catalyst composition, an aliphatic hydrocarbon solvent such as pentane, hexane, or heptane, or an aromatic hydrocarbon solvent such as benzene or toluene may be used for a solvent. Moreover, the metallocene catalyst or the cocatalyst may be used as being supported on a carrier.

Further, the production method of the other embodiment comprises the step of copolymerizing an ethylene or propylene monomer and an α-olefin monomer in the presence of the catalyst composition including the foregoing metallocene catalyst and the cocatalyst. For the α-olefin monomer, one may use at least one selected from the group consisting of 1-butene, 1-pentene, 4-methyl-1-pentene, 1-hexene, 1-hep-tene, 1-octene, 1-decene, 1-undecene, 1-dodecene, 1-tetradecene, 1-hexadecene, and 1-itocene.

In addition, the production method of the olefin block copolymer according to the other embodiment may be carried out under typical conditions for preparing olefin copolymers except for the conditions set forth in the above. Specific examples for such copolymerization conditions are described in the following examples.

EXAMPLES

Hereinafter, some examples will be given for better understanding of the present invention, but the following examples are presented only for a mere illustration though, and the scope of the present invention should not be construed to be defined thereby.

Production Example 1

1) Preparation of a Ligand Compound

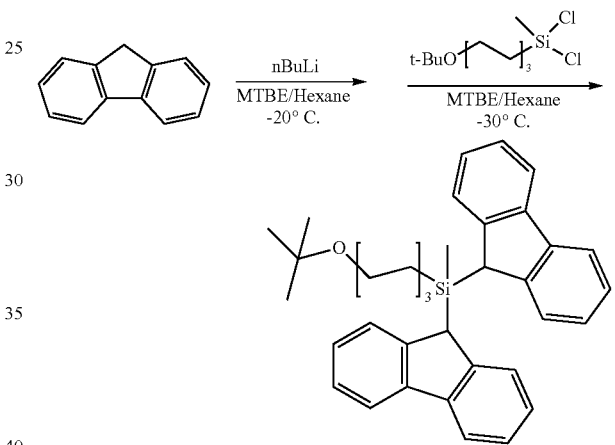

In a THF solvent, a compound of tert-Bu—O—(CH$_2$)$_6$Cl and Mg(0) were reacted to provide 1.0 mole of a solution of a Grignard reagent, tert-Bu—O—(CH$_2$)$_6$MgCl. The Grignard reagent thus obtained was added to a flask containing 176.1 mL (1.5 mol) of MeSiCl$_3$ and 2.0 L of THF at −30° C., and the resulting mixture was stirred for at least 8 hours at room temperature and the solution filtered therefrom was dried under vacuum to provide tert-Bu—O—(CH$_2$)$_6$SiMeCl$_2$. (Yield: 92%)

To a reactor were added 3.33 g (20 mmol) of fluorene, 100 mL of hexane, and 1.2 mL (10 mmol) of methyl tert-butyl ether (MTBE) at −20° C., and 8 ml of n-BuLi (2.5M in Hexane) was slowly added thereto, and stirred at room temperature for six hours. After the completion of the stirring, the temperature of the reactor was down to −30° C. and at this temperature, the fluorenyl lithium solution thus prepared was slowly added to a solution of 2.7 g (10 mmol) of tert-Bu—O—(CH$_2$)$_6$SiMeCl$_2$ dissolved in 100 ml of hexane. The resulting mixture was stirred at room temperature for at least 8 hours, and then water was added thereto for extraction and the resulting product was subject to evaporation to give 5.3 g of (tert-Bu—O—(CH$_2$)$_6$)MeSi(9-C$_{13}$H$_{10}$)$_2$. (Yield: 100%) The ligand structure was determined by $^1$H-NMR.

1H NMR (500 MHz, CDCl$_3$): −0.35 (MeSi, 3H, s), 0.26 (Si—CH$_2$, 2H, m), 0.58 (CH$_2$, 2H, m), 0.95 (CH$_2$, 4H, m), 1.17 (tert-BuO, 9H, s), 1.29 (CH$_2$, 2H, m), 3.21 (tert-BuO- CH$_2$, 2H, t), 4.10 (Flu-9H, 2H, s), 7.25 (Flu-H, 4H, m), 7.35 (Flu-H, 4H, m), 7.40 (Flu-H, 4H, m), 7.85 (Flu-H, 4H, d).

2) Preparation of the Metallocene Compound

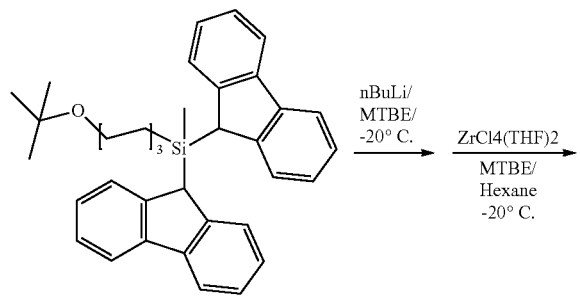

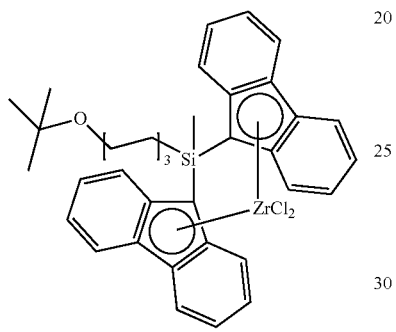

To a solution prepared from 3.18 g (6 mmol) of (tert-Bu—O—(CH$_2$)$_6$)MeSi(9-C$_{13}$H$_{10}$)$_2$ and 20 mL of MTBE was slowly added 4.8 ml of a n-BuLi solution (2.5M, in Hexane) at −20° C. Then, the mixture was warmed to room temperature and reacted for at least 8 hours and then a slurry solution of the dilithium salt thus prepared was slowly added at −20° C. to a slurry solution prepared from 2.26 g (6 mmol) of ZrCl$_4$(THF)$_2$ and 20 mL of hexane and further reacted at room temperature for eight hours. The precipitates were filtered and washed with hexane several times to provide 4.3 g of (tert-Bu—O—(CH$_2$)$_6$)MeSi(9-C$_{13}$H$_9$)$_2$ZrCl$_2$ in the form of a red solid. (Yield: 94.5%)

1H NMR (500 MHz, C6D6): 1.15 (tert-BuO, 9H, s), 1.26 (MeSi, 3H, s), 1.58 (Si—CH$_2$, 2H, m), 1.66 (CH$_2$, 4H, m), 1.91 (CH$_2$, 4H, m), 3.32 (tert-BuO-CH$_2$, 2H, t), 6.86 (Flu-H, 2H, t), 6.90 (Flu-H, 2H, t), 7.15 (Flu-H, 4H, m), 7.60 (Flu-H, 4H, dd), 7.64 (Flu-H, 2H, d), 7.77 (Flu-H, 2H, d)

Production Example 2

1) Preparation of a Ligand Compound

A ligand compound was prepared in the same manner as set forth in Production Example 1 except for using tert-Bu-O—(CH$_2$)$_4$Cl instead of tert-Bu—O—(CH$_2$)$_6$Cl in the preparation of the ligand, and (tert-Bu-O—(CH$_2$)$_4$)MeSi(9-C$_{13}$H$_{10}$)$_2$ was obtained therefrom with a similar yield to that of Production Example 1. The ligand structure was determined by $^1$H-NMR.

1H NMR (500 MHz, C6D6): −0.40 (MeSi, 3H, s), 0.30 (CH$_2$, 2H, m), 0.71 (CH$_2$, 2H, m), 1.05 (tert-BuO, 9H, s), 1.20 (CH$_2$, 2H, m), 2.94 (tert-BuO-CH$_2$, 2H, t), 4.10 (Flu-9H, 2H, s), 7.16 (Flu-H, 4H, m), 7.35 (Flu-H, 4H, m), 7.35 (Flu-H, 2H, d), 7.43 (Flu-H, 2H, d), 7.77 (Flu-H, 4H, d).

2) Preparation of the Metallocene Compound (Tert-Bu—O—(CH$_2$)$_4$)MeSi(9-C$_{13}$H$_9$)$_2$ ZrCl$_2$ was obtained in the same manner as set forth in Production Example 1 with a similar yield except for using (tert-Bu—O—(CH$_2$)$_4$)MeSi(9-C$_{13}$H$_{10}$)$_2$ instead of (tert-Bu-O—(CH$_2$)$_6$)MeSi(9-C$_{13}$H$_{10}$)$_2$.

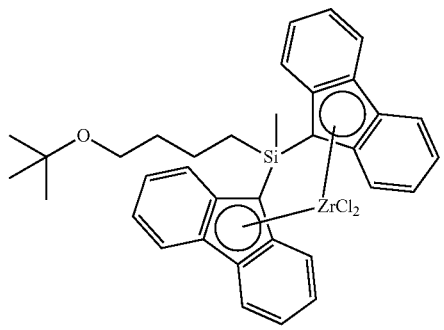

1H NMR (500 MHz, C6D6): 1.14 (tert-BuO, 9H, s), 1.26 (MeSi, 3H, s), 1.90 (CH$_2$, 2H, m), 1.99 (CH$_2$, 2H, m), 2.05 (CH$_2$, 2H, m), 3.39 (tert-BuO-CH$_2$, 2H, t), 6.84 (Flu-H, 2H, m), 6.90 (Flu-H, 2H, m), 7.15 (Flu-H, 4H, m), 7.60 (Flu-H, 6H, d), 7.80 (Flu-H, 2H, d)

Production Example 3

1) Preparation of a Ligand Compound

A ligand compound was prepared in the same manner as set forth in Production Example 1 except for using tert-Bu-O—(CH$_2$)$_8$Cl instead of tert-Bu—O—(CH$_2$)$_6$Cl in the preparation of the ligand, and then (tert-Bu—O—(CH$_2$)$_8$)MeSi(9-C$_{13}$H$_{10}$)$_2$ was obtained therefrom with a similar yield to that of Production Example 1. The ligand structure was determined by 1H-NMR.

1H NMR (500 MHz, C6D6): −0.40 (MeSi, 3H, s), 0.29 (CH$_2$, 2H, m), 0.58 (CH$_2$, 2H, m), 0.83 (CH$_2$, 2H, m), 0.95 (CH$_2$, 2H, m), 1.05 (CH$_2$, 2H, m), 1.14 (tert-BuO, 9H, s), 1.30 (CH$_2$, 2H, m), 1.64 (CH$_2$, 2H, m), 3.27 (tert-BuO-CH$_2$, 2H, t), 4.13 (Flu-9H, 2H, s), 7.17 (Flu-H, 4H, m), 7.26 (Flu-H, 4H, m), 7.37 (Flu-H, 2H, d), 7.43 (Flu-H, 2H, d), 7.78 (Flu-H, 4H, d).

2) Preparation of a Metallocene Compound (Tert-Bu—O—(CH$_2$)$_8$)MeSi(9-C$_{13}$H$_9$)$_2$ ZrCl$_2$ was obtained in the same manner as set forth in Production Example 1 with a similar yield except for using (tert-Bu—O—(CH$_2$)$_8$)MeSi(9-C$_{13}$H$_{10}$)$_2$ instead of (tert-Bu-O—(CH$_2$)$_6$)MeSi(9-C$_{13}$H$_{10}$)$_2$.

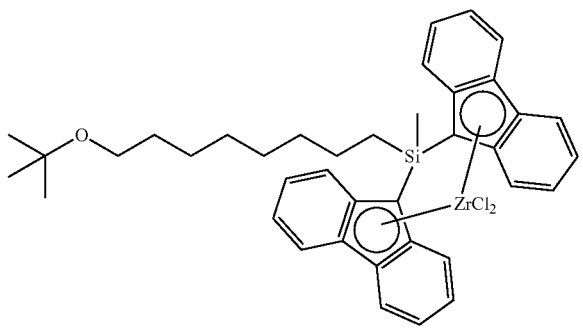

1H NMR (500 MHz, C6D6): 1.17 (tert-BuO, 9H, s), 1.29 (MeSi, 3H, s), 1.41 (CH$_2$, 4H, m), 1.49 (CH$_2$, 2H, m), 1.64 (CH$_2$, 2H, m), 1.89 (CH$_2$, 4H, m), 1.94 (CH$_2$, 2H, m), 3.30 (tert-BuO-CH$_2$, 2H, t), 6.81 (Flu-H, 2H, m), 6.90 (Flu-H, 2H, m), 7.14 (Flu-H, 4H, m), 7.60 (Flu-H, 4H, d), 7.65 (Flu-H, 2H, d), 7.78 (Flu-H, 2H, d)

Examples 1 to 13

Toluene was added to a 500 ml glass reactor and then 1-hexene (or 1-octene for Example 2) was put into the reactor and a 10 wt % solution of methyl aluminoxane (MAO) in toluene was added thereto. Then, a 1 mM solution of the product prepared in Production Example 1, (tert-Bu—O—(CH$_2$)$_6$)MeSi(9-C$_{13}$H$_9$)$_2$ZrCl$_2$) in toluene was put into the reactor and then a polymerization reaction was initiated by introducing ethylene into the reactor. After the resulting mixture was stirred for a predetermined time, the gas in the reactor was vented and a solution of ethanol and hydrochloric acid was poured into the reaction product, which was then stirred, filtered, and then washed with ethanol, and then subjected to evaporation of the solvent to provide an olefin block copolymer.

Regarding the above examples, the content of 1-hexene (or 1-octene) in the total amount of monomers including 1-hexene (or 1-octene) and ethylene was varied to prepare olefin block copolymers.

Comparative Example 1

As an olefin elastomer, an ethylene-1-octene random copolymer marketed by LG. Chem. Ltd. under the trade name of LUCENE™ LC170 was used for Comparative Example 1.

Comparative Example 2

As an olefin block copolymer, an ethylene-1-octene block copolymer marketed from Dow Chemical Co., Ltd. under the trade name of INFUSE™ 9107 (Melt Index (190° C., 2.16 kg): 1 g/10 min; Density: 0.866 g/cm$^3$) was used for Comparative Example 2.

Some properties of the ethylene-α-olefin copolymers as obtained from Examples 1 to 13 and the polymer of Comparative Examples 1 and 2 were measured in accordance with the methods set forth in the following experimental examples.

EXPERIMENTAL EXAMPLES (1) WAXD Pattern Analysis

With using a micro injection molding system (model name: Haake Minijet II, manufactured by Thermo Electron Co., Ltd.), the copolymers obtained from the examples and the comparative examples were melted at 220° C. for three minutes, and then were subjected to a injection molding with a rectangular bar type mold at 40° C. and maintained for 30 seconds. Then, the resulting product was subjected to aging at 250 bar for 60 seconds to provide a sample having a rectangular bar shape (64 mm*12.7 mm*3.2 mm). Each of the samples was used for a density measurement and a WAXD analysis.

For comparison, the WAXD patterns for the block copolymer of Example 8, the random copolymer of Comparative Example 1, and the block copolymer of Comparative Example 2 were shown together in FIG. 1. (In FIG. 1, the solid line: Example 8, the alternating long and short dashed line: Comparative Example 1, and the dashed line: Comparative Example 2) In addition, likewise, the WAXD analysis was carried out for each of Examples 1 to 7 and Examples 9 to 13 to derive the WAXD pattern. In this regard, the drawing range for the WAXD pattern was limited to the 2θ range from about 11° to about 35°.

From the WAXD patterns derived as above, deconvolution was conducted with a single line fitting by using a Fundamental parameter (FP) approach of Bruker TOPAS program to obtain the area of each peak and the ratio therebetween. In this regard, the TOPAS program was run with using the Chebychev 3$^{rd}$ order function. In addition, for the first and the second peaks shown at 2θ of 21.5±0.5° and about 23.7±0.5°, the center of each peak in the TOPAS program was designated at 2θ of about 20 to 22° and about 22 to 24°, respectively, and then the deconvolution was conducted with a single line fitting to obtain the area of each peak. Each peak area was put into the formula, (the area of the first peak at 21.5±0.5°/(the area of the second peak at 23.7±0.5°, to calculate the peak area ratio. The specific 2θ values and the peak area ratios for each peak that are derived as above are summarized in Table 1.

For the first peak of the WAXD pattern, the FWHM value was also determined by using the area function of the Bruker EVA program. In this regard, with the measured range of the first peak as designated from 20° to 23°, it was measured by using the area function. The FWHM values thus obtained are summarized in Table 1.

In the analysis of the WAXD pattern, the measuring instruments being used were as follows:
* Measuring Instruments:
Bruker AXS D8 Endeavor XRD
Cu Kα radiation (wave length; 1.5418 Å)
Vantek position sensitive detector (PSD window: 6°)
Goniometer radius: 217.5 mm
Full Axial model-primary/secondary soller: 2.3°

(2) Degree of Crystallization

First, the area of each peak was calculated in accordance with the method as set forth in section (1). In the WAXD pattern derived as set forth in section (1), the measurement range was also set to be the 2θ range of about 11° to 35°. The center of the halo (the amorphous region pattern that was shown in the lower part of the crystalline peak) appearing in the measurement range was designated as an approximate 2θ value near the center of the above measurement range, and deconvolution was conducted with a single line fitting to provide the halo area. The degree of crystallization was obtained by putting the values of each peak area and the halo area into Mathematical Formula 2. The results are summarized in Table 1. In the WAXD pattern, the drawing range for the measurement of the degree of crystallization was limited to the 2° range from about 11° to 35°. The measuring instruments were the same as set forth in section (1).

Degree of Crystallization(%)=
{(B+C)/(A+B+C)}*100    [Mathematical Formula 2]

In Mathematical Formula 2, A represents the area of the WAXD pattern corresponding to the amorphous region in the 2θ range from about 11° to 35°, for example the halo area as shown in the 2θ range from about 11° to 35°, and B represents the peak area shown at about 21.5±0.5°, and C represents the peak area shown at about 23.7±0.5°.

(3) Density

The density was measured in a Mettler balance by using the sample of the rectangular bar (64 mm*12.7 mm*3.2 mm) that was obtained for the WAXD analysis in section (1). The obtained results are summarized in Table 1.

(4) Melting Temperature ($T_m$) and Crystallization Temperature ($T_a$)

The copolymer sample was heated from a temperature of 30° C. to a temperature of 200° C. at a heating rate of 20° C./min with its equilibration state being maintained, and was kept at that temperature for five minutes, and thereby thermal history of the sample was eliminated. Again, the sample was cooled to 10° C. at a rate of 10° C./min to find out the exothermic peak corresponding to the crystallization temperature. After being kept at 10° C. for one minute, the sample was heated up to 200° C. at a heating rate of 10° C./min, and then kept at that temperature for one minute and cooled again to 30° C., and then the experiment was completed.

In the measurement results obtained from DSC (Differential Scanning calorimeter, manufacture by TA instruments, DSC2920 model), the top of the heat flow curve depending on the temperature within the range descending at a rate of 10° C./min was determined as the crystallization temperature. Within the range ascending at a rate of 10° C./min, the peak having a larger area was determined as a first peak and the peak having a smaller area as a second peak. In this regard, the heating and cooling rates were 10° C./min, respectively. The results measured in the second heating range was used for determining the melting temperature. The melting temperature and the degree of crystallization as measured are summarized in Table 2.

(5) Analysis of the DSC Pattern

After the DSC pattern was derived in the same manner as set forth in section (4), and the first peak and, if present, the second peak were determined, and then with the base line for each peak determined therefrom, each peak area over the base line was calculated. In this regard, for each peak, the highest point of the heat flow curve (in the case where the second derivative of the curve in the DSC pattern is below zero) or the lowest point of the heat flow curve (in the case where the second derivative of the curve in the DSC pattern is above zero) was set as the top of each peak, and the base line was determined based on the top of the peak. The base line was set as the line connecting two highest points of the heat flow curve in the range of about ±20° C. based on the top of the peak wherein the second derivative of the curve in the DSC pattern is below zero. By contrast, the base line was set as the line connecting two lowest points of the heat curve in the above range of the peak wherein the second derivative is above zero. The value of Mathematical Formula 1 was calculated from the areas of the first and the second peaks, and it was also checked whether the second peak was present. The value of Mathematical Formula 1 and the presence of the second peak were checked for Examples 1 to 13 and Comparative Example 1, respectively. The results are summarized in Table 2.

A2/(A1+A2)    Mathematical Formula 1

In Mathematical Formula 1, A1 and A2 represent the areas of the first and the second peaks, respectively.

(6) Analysis for the Hard Segment Content

For the copolymers of the examples and the comparative examples, the content (mole fraction) of the hard segment was calculated by using commercialized Time-Domain NMR equipment (TD NMR equipment manufactured by Bruker Optics Co., Ltd., tradew name: Minspec). First, the Free Induction Decay (FID) for the samples of the examples and the comparative examples were measured by using such TD NMR equipment. The FID thus measured was expressed as a function of the time and the intensity. In addition, a function having a graph most similar to that of the FID function was derived with varying four constants of A, B, $T2_{fast}$, and $T2_{slow}$, and then A, B, $T2_{fast}$, and $T2_{slow}$ for each sample were determined therefrom.

It has been known in the art that in the case of the hard segment, T2 (spin-spin relaxation time) relaxation derived therefrom appears to be very fast, while T2 (spin-spin relaxation time) relaxation derived from the soft segment appears to be very slow. Therefore, among the values of A, B, $T2_{fast}$, and $T2_{slow}$ being determined in the above, a lower value of T2 was determined as the T2 value of the hard segment (i.e., $T2_{fast}$), and a higher value of T2 was determined as T2 value of the soft segment, (i.e., $T2_{slow}$). From these results, the content (mol %) of the hard segment was calculated together with the constants, A and B. The hard segment was calculated in the same manner as previously mentioned for Examples 2, 3, 7, 12, 13, and Comparative Examples 1 and 2 are summarized in Table 1.

Intensity=$A \times$EXP($-$Time/$T2_{fast}$)+$B \times$
EXP($-$Time/$T2_{slow}$)    [Mathematical Formula 3]

The values of A, B, $T2_{fast}$, $T2_{slow}$ were determined through fitting, respectively.

Hard segment(mol %)=$A/(A+B) \times 100$

In Mathematical Formula 3, the intensity and the time are the values derived from the results of the FID analysis, $T2_{fast}$ is the T2 (spin-spin relaxation time) relaxation value for the hard segment, and $T2_{slow}$ is the T2 (spin-spin relaxation time) relaxation value for the soft segment. Further, A and B are the constants determined by the fitting and have the value proportionate to the content of each segment, representing the relative ratios of the hard segment and the soft segment, respectively.

(7) Molecular weight and Molecular Weight Distribution (PolyDispersity Index: PDI)

A number average molecular weight ($M_n$) and a weight average molecular weight ($M_w$) were measured by using gel permeation chromatography (GPC), and then the value of the molecular weight distribution was calculated by dividing the weight average molecular weight by the number average molecular weight. The weight average molecular weight and the PDI for the molecular weight distribution are summarized in Table 2. The characteristic values calculated according to the aforementioned methods are compiled in Table 1 and Table 2, respectively.

(8) Analysis for the Content of the α-Olefin Repeating Units

For the copolymers of the examples 1 to 13, the comparative examples 1 and 2, the contents (mole fraction) of the 1-hexene or 1-octene repeating units were measured by using $^1$H-NMR spectroscopy. Specifically, the contents are measured by quantifying methyl peak at about 0.9 ppm in the 1H-NMR spectrum.

TABLE 1

| Sample | The content of 1-hexene (or 1-octene) (mol %) | The first peak in WAXD pattern 2θ (°) | The first peak in WAXD pattern FWHM | The second peak in WAXD pattern 2θ(°) | The ratio between the areas of the first peak and the second peak | Degree of crystallization (%) | Density (g/cm³) | Content of the hard segment (mol %) |
|---|---|---|---|---|---|---|---|---|
| Example 1 | 6.6 | 21.4 | 0.514 | 23.6 | 2.3 | 23 | 0.898 | No measured value |
| Example 2 | 9.9 (Oc) | 21.5 | 0.505 | 23.7 | 2.4 | 23 | 0.886 | 50.8 |
| Example 3 | 10.6 | 21.5 | 0.509 | 23.7 | 2.3 | 22 | 0.885 | 47.5 |
| Example 4 | 11.4 | 21.3 | 0.522 | 23.7 | 2.6 | 21 | 0.883 | No measured value |
| Example 5 | 11.8 | 21.4 | 0.511 | 23.7 | 2.2 | 22 | 0.880 | No measured value |
| Example 6 | 11.8 | 21.5 | 0.498 | 23.7 | 2.5 | 19 | 0.876 | No measured value |
| Example 7 | 12.7 | 21.5 | 0.489 | 23.8 | 2.2 | 20 | 0.876 | 39.9 |
| Example 8 | 12.5 | 21.4 | 0.505 | 23.7 | 2.1 | 19 | 0.875 | No measured value |
| Example 9 | 13.0 | 21.4 | 0.510 | 23.7 | 2.5 | 20 | 0.875 | No measured value |
| Example 10 | 12.9 | 21.5 | 0.510 | 23.7 | 2.3 | 18 | 0.873 | No measured value |
| Example 11 | 14.1 | 21.5 | 0.503 | 23.7 | 2.4 | 18 | 0.869 | No measured value |
| Example 12 | 15.0 | 21.4 | 0.517 | 23.7 | 2.7 | 16 | 0.868 | 30.9 |
| Example 13 | 17.9 | 21.5 | 0.498 | 23.7 | 2.3 | 16 | 0.865 | 26.6 |
| Comp. Example 1 | 12.0 (Oc) | No peak | No peak | No peak | — | — | 0.873 | — |
| Comp. Example 2 | 16.3 (Oc) | 21.5 | 0.341 | 23.8 | 4.5 | 20 | 0.866 | 30.8 |

* "Oc" refers to using 1-octene for the α-olefin monomer instead of 1-hexene.
* For Examples 1, 4 to 6, and 8 to 11, there was no measured result for the content of the hard segment.
* The polymer of Comparative Example 1 was a random copolymer so that it was impossible to define a plurality of blocks or segments, and thus no result was obatined for the content of the hard segment.

TABLE 2

| | | | | DSC Pattern analysis | |
|---|---|---|---|---|---|
| Samples | Tm (° C.) | Tc (° C.) | Mw | Polydispersity index | Presence of the second peak | Value of the formula A2/(A1 + A2) |
| Example 1 | 121 | 107.2 | 119200 | 2.89 | no | 0.00 |
| Example 2 | 118 | 103.5 | 138000 | 3.10 | no | 0.00 |
| Example 3 | 120 | 104.3 | 129400 | 2.98 | no | 0.00 |
| Example 4 | 122 | 105.4 | 107700 | 2.87 | yes | 0.15 |
| Example 5 | 122 | 105.3 | 101500 | 2.73 | yes | 0.12 |
| Example 6 | 121 | 104.6 | 96400 | 2.52 | no | 0.00 |
| Example 7 | 120 | 105.0 | 99800 | 3.20 | yes | 0.22 |
| Example 8 | 122 | 104.0 | 102600 | 2.60 | yes | 0.23 |
| Example 9 | 120 | 105.2 | 102200 | 2.74 | yes | 0.08 |
| Example 10 | 120 | 104.9 | 96800 | 2.70 | yes | 0.08 |
| Example 11 | 121 | 106.5 | 96700 | 2.82 | yes | 0.29 |
| Example 12 | 119 | 105.1 | 98200 | 2.68 | yes | 0.37 |
| Example 13 | 118 | 104.3 | 75200 | 3.20 | no | 0.00 |
| Comparative Example 1 | 56 | 59.0 | 99700 | 2.49 | no | 0.00 |
| Comparative Example 2 | 124 | 91.0 | 73000 | 2.62 | No measured value | |

* For Comparative Example 2, there was no measured result for the DSC pattern analysis.

With reference to Table 1 and FIG. 1, the block copolymer of the examples were found to have crystalline characteristics wherein in the WAXD pattern the peaks were shown at the 2θ of about 21.5±0.5° and about 23.7±0.5° and the ratio between the peak areas defined by (the peak area at about 21.5±0.5°)/(the peak area at about 23.7±0.5°) was no more than 3.0: It was also found that the FWHM value of the peak shown at about 21.5±0.5° was at least about 0.45° and the degree of crystallization was from about 10 to 30%. With regard to the DSC pattern, the block copolymer of the examples were also observed to have the first peak at a melting temperature, and optionally the second peak at another temperature, satisfying that the ratio between the areas of the first and the second peaks was at least zero but less than one.

In contrast, the random copolymer of Comparative Example 1 was a different type of copolymer from the block copolymers of the examples such that it was impossible to define a plurality of blocks or segments. Besides, it showed no peak in the WAXD pattern and thus failed to have any of the aforementioned crystalline characteristics. The block copolymer of Comparative Example 2 was also found to have different characteristics from the block copolymer of the examples because its FWHM value and the peak area ratio were different therefrom.

It was found that the block copolymers of the examples with such novel crystalline characteristics exhibited excellent heat resistance as well as a high melting point that is much higher than that of Comparative Example 1 and comparable to that of Comparative Example 2. In addition, the block copolymer of the examples were found to have a higher crystallization temperature and a broadened molecular weight distribution when being compared with the copolymer of Comparative Examples 1 and 2. From these results, it was confirmed that the block copolymers of the examples had a higher speed of the crystallization when being subject to a melting process in comparison with the copolymers of Comparative Examples 1 and 2, indicating excellent processability and moldability into a product.

In addition, the block copolymers of the examples have the hard segments and the soft segments defined therein and they comprise each segment in a certain content, and they have a certain amount of the α-olefin monomers copolymerized therein to show a certain degree of density, exhibiting excellent elasticity as an elastomer.

What is claimed is:

1. An olefin block copolymer comprising a plurality of blocks or segments that comprise ethylene or propylene repeating units and C4 or more α-olefin repeating units at different mole fractions from one another,
   wherein the block copolymer shows peaks at the 2θ of 21.5±0.5° and 23.7±0.5° in its wide-angle x-ray diffraction (WAXD) pattern; and the peak ratio as defined by (the peak area at 21.5±0.5°)/(the peak area at 23.7±0.5°) is no more than 3.0.

2. The olefin block copolymer in accordance with claim 1, wherein the peak as shown at 21.5±0.5° has a full width at half maximum (FWHM) value of at least 0.45°.

3. The olefin block copolymer in accordance with claim 1, wherein the degree of crystallization as derived from a ratio of a crystalline peak area to a pattern area of the WAXD pattern is from 10 to 30%.

4. The olefin block copolymer in accordance with claim 1, wherein the block copolymer has a crystallization temperature ($T_c$) of 95 to 120° C.

5. The olefin block copolymer in accordance with claim 1, wherein the block copolymer has a melting temperature ($T_m$) of 110 to 135° C.

6. The olefin block copolymer in accordance with claim 1, wherein the block copolymer comprises a hard segment comprising a first mole fraction of C4 or more α-olefin repeating units and a soft segment comprising a second mole fraction of C4 or more α-olefin repeating units, and the second mole fraction is higher than the first mole fraction.

7. The olefin block copolymer in accordance with claim 6, wherein the mole fraction of C4 or more α-olefin repeating units contained in the entire block copolymer has a value between the first mole fraction and the second mole fraction.

8. The olefin block copolymer in accordance with claim 6, wherein the block copolymer comprises 20 to 95 mol % of hard segments and 5 to 80 mol % of soft segments.

9. The olefin block copolymer in accordance with claim 6, wherein the hard segment has a higher value than the soft segment in at least one characteristic among a degree of crystallization, a density, and a melting temperature.

10. The olefin block copolymer in accordance with claim 1, wherein the block copolymer comprises 80 to 98 mol % of ethylene or propylene repeating units and a remaining amount of C4 or more α-olefin repeating units.

11. The olefin block copolymer in accordance with claim 1, wherein the block copolymer has a density of 0.85 g/cm³ to 0.92 g/cm³.

12. An olefin block copolymer comprising a plurality of blocks or segments that comprise ethylene or propylene repeating units and C4 or more α-olefin repeating units at different mole fractions from one another, wherein the block copolymer shows peaks at the 2θ of 21.5±0.5° and 23.7±0.5° in its wide-angle x-ray diffraction (WAXD) pattern; and the peak as shown at 21.5±0.5° has a full width at half maximum (FWHM) value of at least 0.45°.

* * * * *